United States Patent [19]

Kim

[11] Patent Number: 5,686,972
[45] Date of Patent: Nov. 11, 1997

[54] CIRCUIT FOR ADAPTIVELY SEPARATING LUMINANCE AND COLOR SIGNALS BASED ON EXPENDED VERTICAL AND HORIZONTAL CORRELATIONS AND METHOD THEREFOR

[75] Inventor: Yeong-Taeg Kim, Suwon, Rep. of Korea

[73] Assignee: Samsung Electronics Co., Ltd., Kyungki-do, Rep. of Korea

[21] Appl. No.: 490,762

[22] Filed: Jun. 15, 1995

[30] Foreign Application Priority Data

Jun. 18, 1994 [KR] Rep. of Korea ............ 13810/1994

[51] Int. Cl.$^6$ ............................................. H04N 9/78
[52] U.S. Cl. ..................... 348/663; 348/665; 348/667
[58] Field of Search ............................ 348/665, 663, 348/667, 668; H04N 9/78

[56] References Cited

U.S. PATENT DOCUMENTS

| | | | |
|---|---|---|---|
| 4,839,727 | 6/1989 | Tanaka et al. | 348/663 |
| 5,305,095 | 4/1994 | Song | 348/665 |
| 5,367,342 | 11/1994 | Bang | 348/667 |
| 5,475,445 | 12/1995 | Yamaguchi et al. | 348/663 |

*Primary Examiner*—Glenton B. Burgess
*Attorney, Agent, or Firm*—Sughrue,Mion,Zinn,Macpeak & Seas, PLLC

[57] ABSTRACT

A technique for effectively separating luminance and color signals from a composite video signal in an NTSC-type television system sampled at 4 times the color subcarrier frequency in an NTSC type picture processing system includes steps for (1) delaying the composite video signal through a plurality of line and sample delay elements and then generating a plurality of sample signals; (2) detecting the correlations between a predetermined reference sample signal and the sample signals in the neighborhood which are in phase with the predetermined reference sample signal and then delaying the composite video signal; (3) determining any direction in which the luminance and color signals are separated and filtered; (4) separating and filtering the luminance and color signals from the composite video signal in the determined direction or in a plurality of predetermined directions; (5) detecting the vertical and horizontal correlation of sample signals which are out of phase with the reference sample signal and are separated from the reference sample signal in the upper/lower/left/right directions; and (6) selecting the luminance and color signals which have been separated and filtered in the separating and filtering step on the basis of the vertical and horizontal correlation. Circuitry suitable for performing the method described above is also described.

13 Claims, 6 Drawing Sheets

CIRCUIT FOR ADAPTIVELY SEPARATING LUMINANCE AND COLOR SIGNALS BASED ON EXPENDED VERTICAL AND HORIZONTAL CORRELATIONS AND METHOD THEREFOR

BACKGROUND OF THE INVENTION

1. Field of the Invention

The present invention relates to a television receiver of an NTSC system and, more particularly, to an apparatus for effectively separating luminance and color.

The instant application is based on Korean Patent Application No. 13810/1994, which is incorporated herein by reference for all purposes.

2. Brief Discussion of Related Art

The Y/C separation is the most important factor in determining the quality of a picture. Comb filtering and trapping methods have been used for separating Y/C signals, the former being widely employed these days. This comb filtering method separates the luminance signal Y and the color signal C working with the assumptions that the phase of the color signal C is inverted in every 1H line and that the signals separated from the present reference signal by 1H line are similar to each other. However, the Y/C signal separating method has the problem that if an edge is detected in the horizontal or vertical direction, the horizontal or vertical resolution rapidly deteriorates, making it is impossible to accurately separate the Y/C signals.

In order to prevent the performance of the Y/C signal separating circuit from being degraded by the existence of an edge, the prior art employs a Y/C signal separating method taking into consideration the horizontal and vertical sample correlations.

FIG. 1 shows a horizontal/vertical correlation-adaptive type Y/C signal separating circuit according to the prior art, wherein the composite video signal CVS is directly applied to a sample delay circuit 14 and is also applied to a sample delay circuit 16 after being delayed by a 1H line through a line delay circuit 10. It is well-known that the composite video signal CVS applied to the Y/C signal separating circuit has a color subcarrier frequency $f_{SC}$ of 3.58 MHz and is sampled at four times the color subcarrier frequency, i.e., at the frequency of $4f_{SC}$ (14.32 MHz). The composite video signal which has been delayed by a 1H line through the line delay circuit 10 is delayed again by a 1H line through a line delay circuit 12 and then is applied to a sample delay circuit 18. The sample delay circuit 14 delays by 2 sample distances the composite video signal which has not been delayed; the sample delay circuit 16 delays by 2 sample distances the composite video signal which has been delayed by a single 1H line; and the sample delay circuit 18 delays by 2 sample distances the composite video signal which has been delayed by 2 1H lines. A sample delay circuit 20 delays by 2 sample distances the composite video signal after it has been delayed by a 1H line through the line delay circuit 10 and by 2 sample distances through the sample delay circuit 16. It will be appreciated that the sample distance herein represents the period of the sampling frequency which has been sampled at four times the color subcarrier frequency.

A vertical filter (hereinafter referred to as a "V filter") 22 separates and filters the Y/C signals by using the outputs u, P, and d of the sample delay circuits 14, 16 and 18, respectively. A horizontal filter (hereinafter referred to as an "H filter") 24 separates and filters the Y/C signals, receiving as input sample signal 1, the output of the line delay circuit 10, and sample signals P and r, the outputs of the sample delay circuits 16 and 20.

The sample signals P, 1, r, u and d are the outputs of the line and sample delay circuits shown in FIG. 1. The sample signal 1 is delayed by a 1H line. The sample signal P is delayed by a 1H line and 2 sample distances. The sample signal r is delayed by a 1H line and 4 sample distances. Here, the sample signals 1 and r are used to estimate the horizontal correlation on the basis of the sample signal P. The sample signal u is delayed by 2 sample distances while the sample signal d is delayed by 2H lines and 2 sample distances. These sample signals u and d are used to estimate the vertical correlation on the basis of the sample signal P. The sample signal is in the form of Y+C (or Y−C), and the phase of the color signal C is inverted every 2 samples. In the case that the color signal C of the sample signal is a signal I (or signal Q), the sample signal separated from the signal I by 1 sample distance is a signal Q (or signal I).

From the above description, it can be seen that the V filter 22 separates and filters the Y/C signal by using the sample signals u and d with respect to the vertical direction on the basis of the sample signal P, and that the H filter 24 separates and filters the Y/C signal by using the sample signals 1 and r with respect the horizontal direction on the basis of the sample signal P.

A comparator 26 receives the sample signals u, d, r and 1 which have been delayed through the line or/and sample delay circuits, and compares the difference $D_V$ between the sample signals u and d in the vertical direction with the difference $D_H$ between the sample signals 1 and r in the horizontal direction, generating either a V filter selection signal or a H filter selection signal in response to the result of the comparison. If the value $D_V$+K, where K is some constant, is higher than the difference $D_H$, the comparator 26 outputs the H filter selection signal; otherwise, it outputs the V filter selection signal.

The fact that one of the differences between the sample signals in the vertical direction and the difference between the sample signals in the horizontal direction is larger than the other indicates that the sample signals in the same direction are weakly correlated, that is, an edge is detected therebetween.

Thus, if the V filter selection signal is applied from the comparator 26, a filter selector 28 selects the output of the V filter 22. If the H filter selection signal is applied, the filter selector 28 selects the output of the H filter 24. The output signal of the filter selector 28 is band-pass filtered through a band pass filter 29. The signal output from band pass filter 29 is the color signal C. An adder 30 adds the negative color signal C to the reference sample signal P, thus providing the luminance signal Y.

FIG. 2 shows the method of selecting either the V filter 22 or the H filter 24, depending on the differences $D_V$ and $D_H$ between the sample signals in the vertical/horizontal directions. Referring to FIG. 2, if $D_H>D_V$+K, the V filter 22 is employed, and if $D_H<D_V$+K, the H filter 24 is employed. The constant K, which is added to the difference signal $D_V$ and which is typically a positive number, is used to effectively separate and filter the Y/C signals.

As described above, the vertical/horizontal correlation adaptive type Y/C signal separating circuit of the prior art comprising two filters for filtering Y/C signal in the vertical and horizontal directions, respectively, compares the difference between the samples delayed by 4 sample distances in the horizontal direction with the difference between the samples delayed by 2H lines in the vertical direction, and selects one of the vertical and horizontal filters, which one has the stronger correlation, in response to the comparison result, thus filtering the composite video signal.

The above Y/C signal separating circuit has relatively high performance as compared to the sample horizontal or vertical filter which separates and filters the Y/C signal only in one direction. However, in the situation where edges are detected in both horizontal and vertical directions, or an edge is detected in any other direction, e.g., in a diagonal direction, a striking drop in performance results.

SUMMARY OF THE INVENTION

It is therefore an object of the present invention to provide an apparatus for effectively separating luminance and color signals from a composite video signal, considering the existence of edges and the spatial direction of the edges.

Another object of the present invention is to provide a method for effectively separating luminance and color signals from a composite video signal, considering the existence of edges and the spatial direction of the edges.

It is another object of the present invention to provide a method of adaptively determining the direction in which the luminance and color signals are separated and filtered, by further considering the correlations between a predetermined reference sample signal and the sample signals in the neighborhood.

To achieve the above objects of the present invention, the method for separating the luminance and color signals from the composite video signal sampled at 4 times the color subcarrier frequency in an NTSC type picture processing system comprises the steps of: (1) delaying the composite video signal through a plurality of line and sample delay elements and then generating a plurality of sample signals; (2) detecting the correlations between a predetermined reference sample signal and the sample signals in the neighborhood which are in phase with the predetermined reference sample signal and then delaying the composite video signal; (3) determining any direction in which the luminance and color signals are separated and filtered; (4) separating and filtering the luminance and color signals from the composite video signal in the determined direction or in a plurality of predetermined directions; (5) detecting the vertical and horizontal correlation of sample signals which are out of phase with the reference sample signal and are separated from the reference sample signal in the upper/lower/left/right directions; and (6) selecting the luminance and color signals which have been separated and filtered in the separating and filtering step on the basis of the vertical and horizontal correlation.

In order to achieve the other objects of the present invention, a circuit for separating the luminance and color signals from the composite video signal in the NTSC type picture processing system comprises: (1) a sample signal generating circuit for delaying the composite signal through a plurality of line and sample delay elements and then generating a plurality of sample signals; (2) a first filter for (a) detecting the correlations between the reference sample signal and respective sample signals, which are placed in its neighborhood and are in phase with the reference sample signal, and then (b) separating and filtering the luminance and color signals from the composite video signal in the direction of the sample signal having the strongest correlation with the reference sample signal, (3) a second filter for separating and filtering in a predetermined direction the luminance and color signals from the sample signals generated from the sample signal generating circuit, (4) a correlation detector for detecting the horizontal and vertical correlation of the sample signals which are out of phase with the reference sample signal, and (5) a filter selector for selecting either the first or the second filter, on the basis of the horizontal and vertical correlation and the predetermined filter selecting threshold values.

BRIEF DESCRIPTION OF THE DRAWINGS

In the detailed description of the preferred embodiments of the present invention presented below, reference is made to the accompanying drawings, in which.

DETAILED DESCRIPTION OF THE PREFERRED EMBODIMENT

Figure 3:
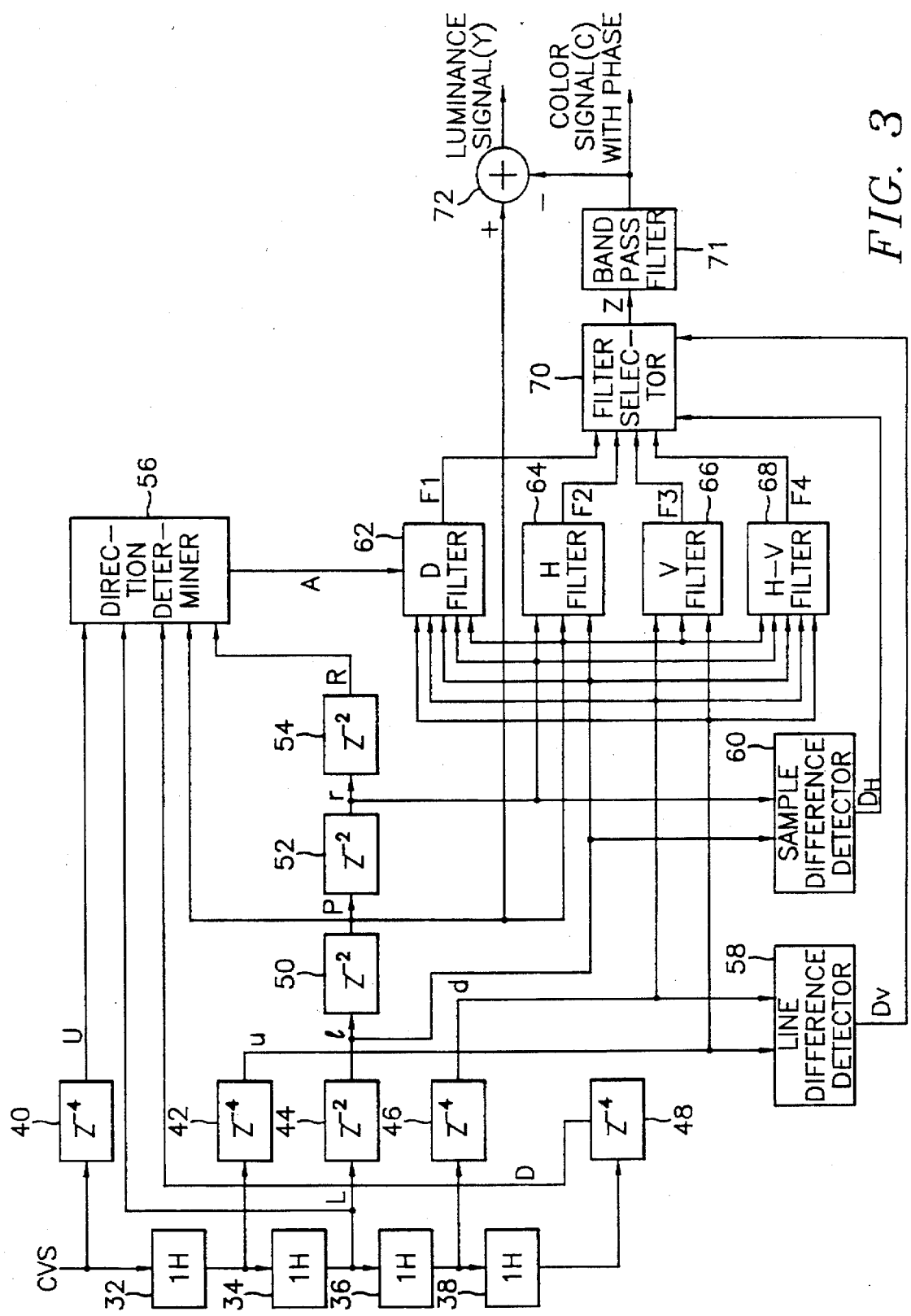
FIG. 3 is a high level block diagram of a Y/C signal separating circuit according to the present invention.

FIG. 3 shows a Y/C signal separating circuit according to the present invention. Line delay circuits 32, 34, 36 and 38 are advantageously connected in cascade. The line delay circuit 32 receives a composite video signal (CVS). Sample delay circuits 42, 44, 46, and 48 are respectively coupled to the I/O lines of the line delay circuits 32, 34, 36, and 38. Preferably, sample delay circuit 40 is coupled to the input line of the line delay circuit 32, sample delay circuit 42 is coupled to the output line of the line delay circuit 32, sample delay circuit 44 is coupled to the output line of the line delay circuit 34, sample delay circuit 46 is coupled to the output line of the line delay circuit 36, and sample delay circuit 48 is coupled to the output line of the line delay circuit 38. The sample delay circuit 50 is coupled to the output line of the sample delay circuit 44, the sample delay circuit 52 is coupled to the output line of the sample delay circuit 50, and the sample delay circuit 54 is coupled to the output line of the sample delay circuit 52.

With these connections, the line delay circuits 32, 34, 36 and 38 respectively delay the composite video signal by an additional 1H line each. The sample delay circuit 40 delays the composite video signal by 4 sample distances. The sample delay circuit 42 delays the 1H line delayed signal by 4 sample distances; the sample delay circuit 44 delays the 2H lines delayed signal by 2 sample distances; the sample delay circuit 46 delays the 3H lines delayed signal by 4 sample distances; and the sample delay circuit 48 delays the 4H lines delayed signal by 4 sample distances. The sample delay circuits 50, 52 and 54 sequentially delay the 2H lines and 2 sample distances delayed signal by an additional 2 sample distances each.

A direction determiner 56 receives the outputs of the sample and line delay circuits 40, 48, 50, 54 and 36, labeled sample signals U, D, P, R and L, respectively. The direction determiner 56 detects the correlations between the sample signals (P and U), and (P and D), where U and D are separated from P by 2H lines, and between the sample signals (P and L), and (P and R), where L and R are separated from P by 4 sample distances. The Y/C signals are separated and filtered in the direction of the sample signal having the strongest correlation with the sample signal P. The direction determiner 56 outputs to the diagonal filter (hereinafter referred to as a "D filter") 62 the direction control signal A corresponding to the spatial direction in which the Y/C signals are separated.

The D filter 62 receives the outputs of the sample delay circuits 50, 42, 44, 46 and 52, labeled sample signals P, u, l, d and r, and filters these sample signals in a respective direction corresponding to that of the direction control signal A applied from the direction determiner 56, thus outputting a first filter signal F1 to a filter selector 70.

The horizontal filter ("H filter") 64 receives the outputs of the sample delay circuits 44, 50 and 52, labeled sample signals l, P and r, and then filters these sample signals in the horizontal direction, thus outputting a second filter signal F2 to the filter selector 70.

The vertical filter ("V filter") 66 receives the outputs of the sample delay circuits 42, 50 and 46, labeled sample signals u, P and d, and then filters these sample signals in the vertical direction, thus outputting a third filter signal F3 to the filter selector 70.

The H-V filter 68 receives the outputs of the sample delay circuits 50, 42, 44, 46 and 52, labeled sample signals P, u, l, d and r, and then filters these sample signals regardless of the vertical/horizontal directions, thus outputting a fourth filter signal F4 to the filter selector 70.

A line difference detector 58 receives the outputs of the sample delay circuits 42 and 46, i.e., sample signals u and d, and then detects the absolute value of the difference therebetween, thus outputting a vertical difference detecting signal $D_V$ to the filter selector 70. A sample difference detector 60 receives the outputs of the sample delay circuits 44 and 52, labeled sample signals l and r, and then detects the absolute value of the difference therebetween, thus outputting a horizontal difference detecting signal $D_H$ to the filter selector 70.

The filter selector 70 receives the first, second, third and fourth filter signals F1, F2, F3 and F4, respectively output from the D filter 62, H filter 64, V filter 66 and H-V filter 68, and then compares the vertical and horizontal difference detecting signals $D_V$ and $D_H$ with the predetermined first and second vertical/horizontal threshold values, thus selecting and outputting any of the four respective filter signals, based on the comparison.

A band-pass filter 71 band-pass filters the high frequency region of the output signal Z of the filter selector 70, and outputs the color signal C. An adder 72 adds the negative color signal C to the sample signal P output from the sample delay circuit 50, thus outputting the luminance signal Y.

Figure 1:
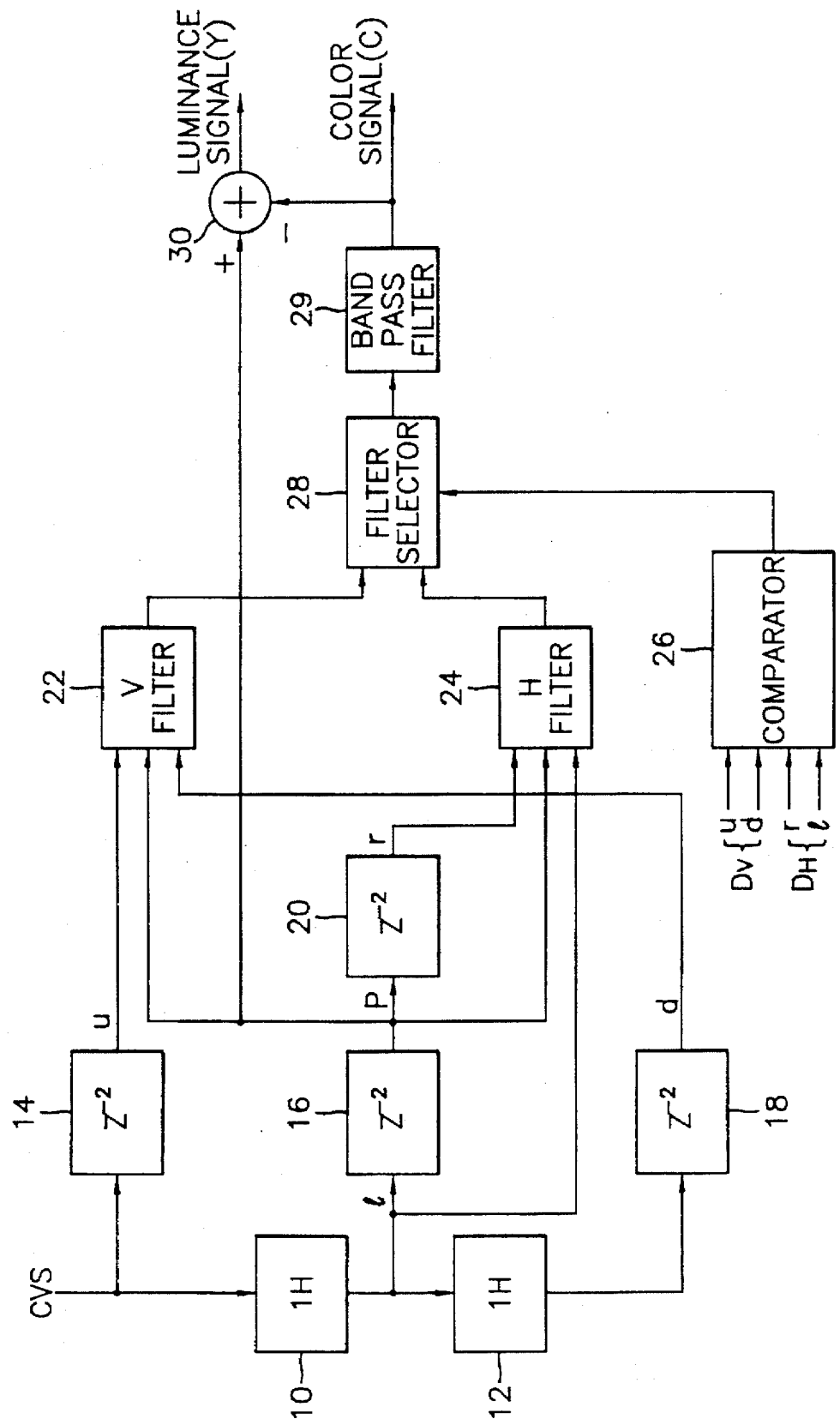
FIG. 1 shows a vertical/horizontal correlation adaptive type Y/C signal separating circuit according to a prior art.
Figure 2:
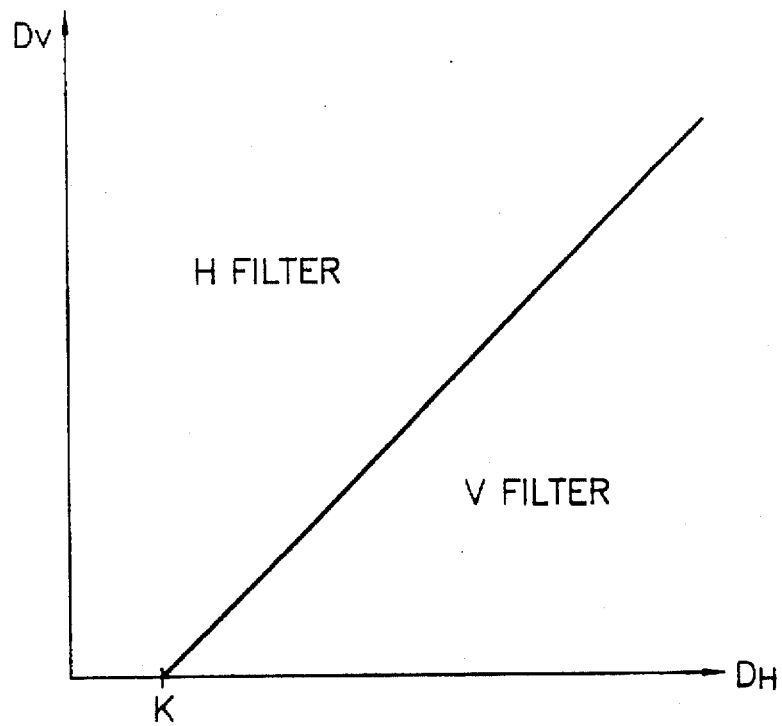
FIG. 2 is a diagram showing a prior art method for selecting any filter, based on the vertical/horizontal correlation.
Figure 4:
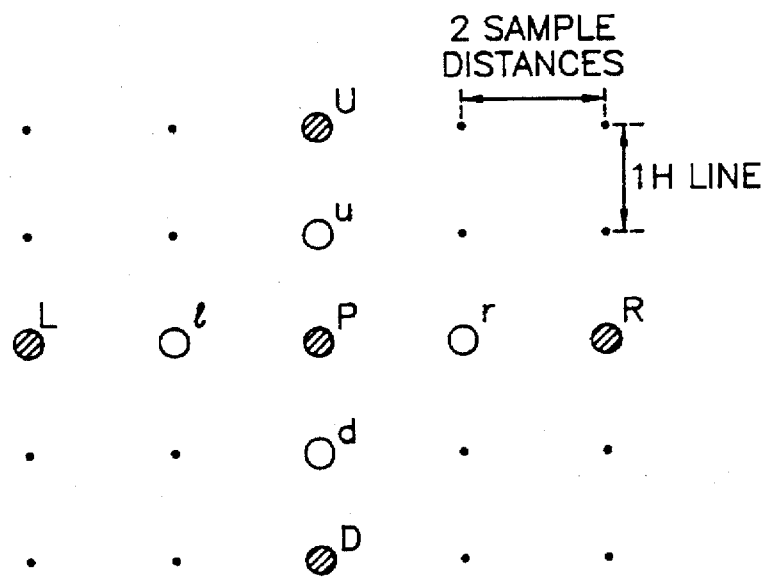
FIG. 4 is an illustration showing the sample signals, generated using the circuitry FIG. 3, displayed on a television screen.

FIG. 4 is a diagram showing the sample signals P, L, R, u, d, l, r, U and D displayed on the television screen.

Using sample signal P as a reference sample point, the sample signal U separated, by 2 lines in the upper direction from the reference sample signal P, sample signal D separated by 2 lines in the lower direction from the reference sample signal P, sample signal L separated by 4, sample separated in the left direction from the sample signal P, sample signal R, separated by 4 sample distances in the right direction from the sample signal P, are all in phase with the reference sample signal P. For instance, if the reference sample signal P is Y+C (or Y−C), the above four signals U, D, L and R are also Y+C (or Y−C).

The sample signals U, D, R, L and P, indicated by hatched circles in FIG. 4, are applied to the direction determiner 56 to select the direction in which the D filter 62 adaptively separates and filters the Y/C signal on the basis of the direction where an edge is detected. The sample signals u, d, r and l indicated by blank circles have an inverted color phase, as compared to that of the reference sample signal P, and are applied to the line and sample difference detectors 58 and 60 in order to detect the absolute values of the differences between the sample signals in the vertical/horizontal directions.

The operation of the direction determiner 56 will now be described in detail with reference to FIGS. 3 and 4.

The direction determiner 56 receives five sample signals U, D, R, L and P as illustrated in FIGS. 3 and 4 and then outputs one direction control signal A. In order to generate the direction control signal A, the direction determiner 56 performs the operation of $$\text{Min} = \min(|P-U|, |P-D|, |P-R| \text{ and } |P-L|) \tag{1}$$

where Min is the minimum value among |P−U|, |P−D|, |P−R| and |P−L|, and min represents the operation of finding the minimum among its four input values, |P−U|, |P−D|, |P−R| and |P−L|.

Referring to FIG. 4, |P−U| is the difference between the reference sample signal P and the sample signal U separated by 2 lines in the upper direction from the sample signal P, |P−D| is the difference between the reference sample signal P and the sample signal D separated by 2 lines in the lower direction from the sample signal P, |P−R| is the difference between the reference sample signal P and the sample signal R separated by 4 sample distances in the right direction from the sample signal P, and |P−L| is the difference between the reference sample signal P and the sample signal L separated by 4 sample distances in the left direction from the sample signal P. These sample signals U, D, R and L are the 4 nearest samples which are in phase with the reference sample signal P. Thus, the sample signal which gives the minimum value in equation (1) is most strongly correlated with the reference sample signal P. Of course it is possible that no edge is detected between the sample signals having the strongest correlation.

Preferably, in equation (1), if |P−U| is the minimum value, the direction control signal A output from the direction determiner 56 becomes the logic value, e.g., A="00", showing the highest correlation in the upper direction. If |P−D| is the minimum value, the direction control signal A becomes the logic value, e.g., A="01", showing the highest correlation in the lower direction. If |P−R| is the minimum value, the direction control signal A becomes the logic value, e.g., A="10", showing the highest correlation in the right direction. If |P−L| is the minimum value, the direction control signal A becomes the logic value, e.g., A="11", showing the highest correlation in the left direction. The logic value of the direction control signal A applied from the direction determiner 56 to the D filter 62 is thus determined, and is advantageously used to control the first filter signal F1 of D filter 62.

It will be appreciated the operation of equation (1) can be either hard-wired using of comparators and difference detectors, or alternatively, can be accomplished via software.

Figure 5:
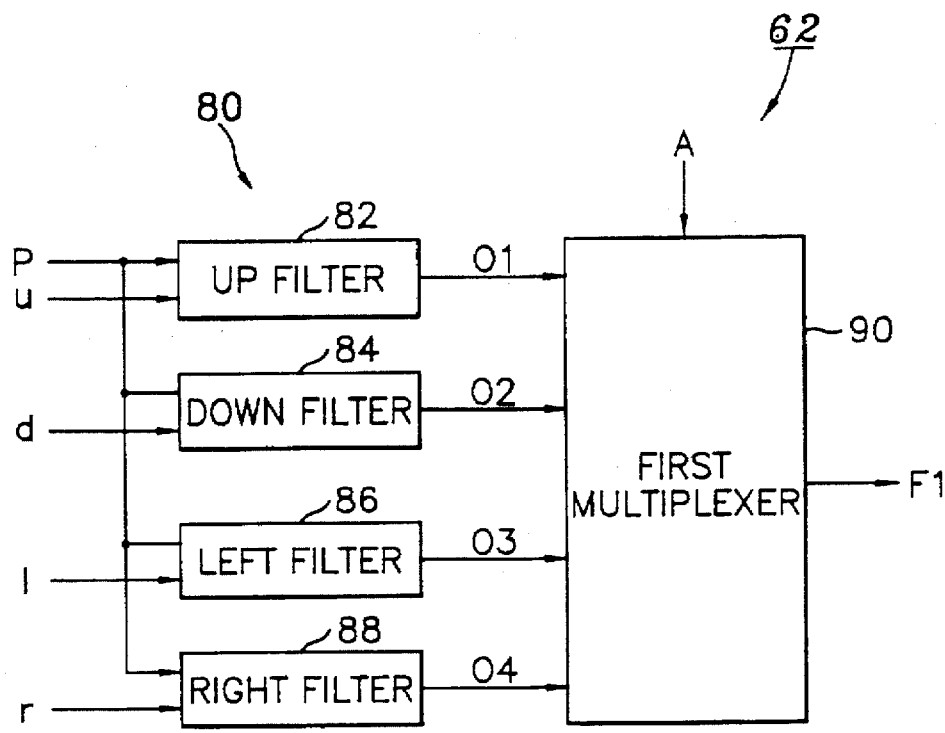
FIG. 5 is a detailed block diagram showing a "D" filter included in the circuitry of FIG. 3.

FIG. 5 is a detailed circuit diagram of the D filter in FIG. 3, which includes: (1) a direction filtering unit 80 receiving the sample signals P, l, r, u and d, filtering these sample signals in the upper/lower/left/right directions, respectively, and outputting first to fourth filter signals 01 to 04 to a first multiplexer 90. Advantageously, any one of the four filter signals 01 to 04 can be output from the direction filtering unit 80 in response to the direction control signal A applied from the direction determiner 56 of FIG. 3, and (5) to thereby output the first filter signal F1. The direction filtering unit 80 has an up-filter 82, a down-filter 84, a left filter 86 and a right-filter 88, which filters have identical functions.

The up filter 82 receives the sample signal P and the sample signal u and filters the composite video signal in the upper direction on the basis of the sample signal P, thus outputting the first filter signal 01. The down-filter 84 receives the sample signal P and the sample signal d and filters the composite video signal in the lower direction on the basis of the sample signal P, thus outputting the second filter signal 02. The left filter 86 receives the sample signal P and the sample signal l and filters the composite video signal in the left direction on the basis of the sample signal P, thus outputting the third filter signal 03. The right filter 88 receives the sample signal P and the sample signal r and filters the composite video signal in the right direction on the basis of the sample signal P, thus outputting the fourth filter signal 04.

Up filter 82, down filter 84, left filter 86 and right filter 88, respectively, output the first, second, third and fourth filter signals 01 to 04 which are obtained by performing the operations of $$01 = \frac{(P-u)}{2}, \quad (2)$$

$$02 = \frac{(P-d)}{2}, \quad (3)$$

$$03 = \frac{(P-r)}{2}, \quad (4)$$

and $$04 = \frac{(P-l)}{2}, \quad (5)$$

where 01 to 04 indicate first to fourth filter signals and P, u, d, r and l indicate the sample signals.

Thus, the first filter signal F1 output from multiplexer 90 is determined in response to the direction control signal A output from the direction determiner 56 as follows:

if A="up", F1=01,
if A="down", F1=02,
if A="left", F1=03, and
if A="right", F1=04, Consequentially, the first filter signal F1 output from the D filter 62 has direction determined according to the direction control signal A.

In the case that edges are detected in various directions, the D filter 62 can adapt the predetermined sample signal to any direction of the signal having the strongest correlation with the predetermined sample signal. Such a performance of the D filter 62 makes it possible to improve the resolution.

Figure 6:
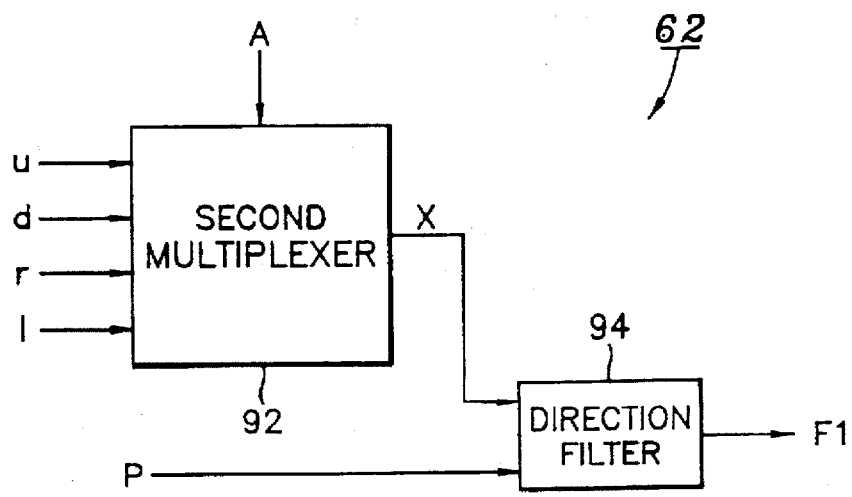
FIG. 6 is a diagram showing another embodiment of the "D" filter according to the present invention.

FIG. 6 shows another embodiment of the D filter in FIG. 3. In FIG. 6, a second multiplexer 92 receives the sample signals u, d, r and l, and selects one sample signal in response to the direction control signal A, thus outputting the selected sample signal X. A direction filter 94 receives the sample signal X output from the second multiplexer 92 and the reference sample signal P, and then separates and filters the Y/C signals. The function of the direction filter 94 is the same as that of each filter in the direction filter 80 of FIG. 5.

The operation of the D filter 62 will now be described in detail with reference to FIG. 6. The second multiplexer 92 receives the outputs of the sample delay circuits 42, 46, 44 and 52, labeled sample signals u, d, r and l, selects one sample signal X in response to the direction control signal A as follows:

if A="up", X=u,
if A="down", X=d,
if A="left", X=l, and
if A="right", X=r, and then outputs the selected sample signal X to the direction filter 94. The direction filter 94 receives the sample signal X and the reference sample signal P and then separates and filters the Y/C signals in the direction of the selected sample signal X.

Thus, the direction filter 94 performs the operation of $$F1 = \frac{(P-X)}{2}, \quad (6)$$

to output the first filter signal F1. In the equation (6), the sample signal X is assigned to one of u, d, r or l. Thus, the above-mentioned equations (2), (3), (4) and (5) can be obtained by substituting these sample signals u, d, r and l for the sample signal X in equation (6).

As compared with the D filter of FIG. 5, the preferred embodiment of the D filter 62 in FIG. 6 is simplified in structure by using only one of four filters in the direction filtering unit 80.

Turning back to FIG. 3, the Y/C signal separating and filtering operations of the H filter 64, V filter 66 and H-V filter 68 will now be described in detail with reference to FIG. 4.

The H filter 64 is a horizontal Y/C signal separating filter, and performs the operation of $$F2 = \frac{(2P-r-l)}{4} \quad (7)$$

to output the second filter signal F2 to the filter selector 70.

The V filter 66 is a vertical Y/C signal separating filter, and performs the operation of $$F3 = \frac{(2P-d-u)}{4} \quad (8)$$

to output the third filter signal F3 to the filter selector 70.

The H-V filter 68 is a filter for separating the Y/C signal regardless of the horizontal/vertical directions, and performs the operation of $$F4 = \frac{(4P-r-l-u-d)}{8} \quad (9)$$

to output the fourth filter signal F4 to the filter selector 70.

Referring to FIGS. 3 and 4, the line difference detector 58 detects the difference of the sample signals u and d and then outputs the vertical difference detecting signal $D_V$. If the value of the vertical difference detecting signal $D_V$ is high, this means that an edge is detected between the sample signals u and d. On the contrary, if the value of the vertical difference detecting signal $D_V$ is low, this means that no edge is detected in the vertical direction.

The sample difference detector 60 detects the absolute value of difference of the sample signals l and r and then outputs the horizontal difference detecting signal $D_H$. If the value of the horizontal difference detecting signal $D_H$ is high, this means that an edge is detected in the horizontal direction.

The vertical and horizontal difference detecting signals $D_V$ and $D_H$, respectively output from the line and sample difference detectors 58 and 60, are applied to the filter selector 70. The filter selector 70 selects one of the outputs of the D filter 62, H filter 64, V filter 66 and H-V filter 68, depending on the vertical and horizontal difference detecting signals $D_V$ and $D_H$, as well as predetermined horizontal/vertical threshold values.

Figure 7:
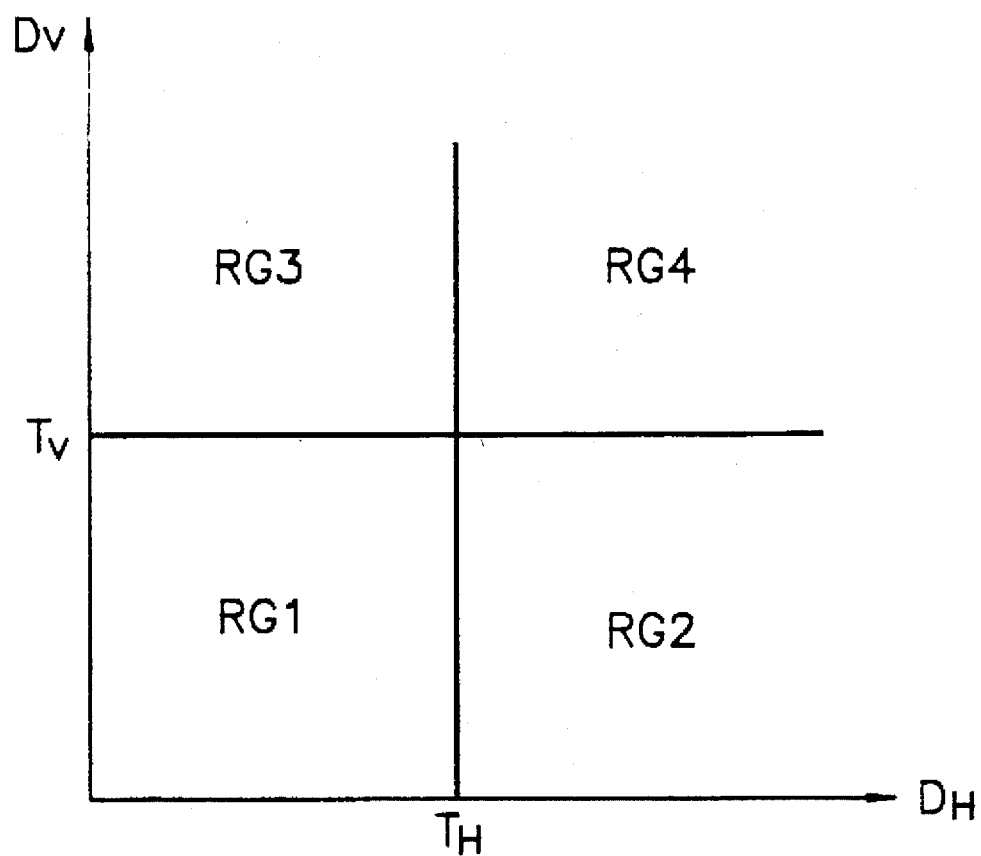
FIG. 7 is a diagram showing a method for selecting any of the filters of FIG. 3 according to the present invention, based on the vertical/horizontal correlation.

FIG. 7 shows the four regions that the filter selector 70 selects according to the vertical and horizontal difference detecting signals $D_V$ and $D_H$. In FIG. 7, $T_H$ and $T_V$ are the horizontal/vertical threshold values for setting up the horizontal/vertical Y/C signal separating/filtering regions, as the predetermined values in the filter selector 70. The filter selector 70 uses these threshold values together with the vertical and horizontal difference detecting signals $D_V$ and $D_H$ to select any one of the outputs of four filters.

A first region RG1 is selected to employ the H-V filter 68 when no edge is detected between the predetermined sample signals. A second region RG2 is selected to employ the V filter 66 when an edge is detected in the horizontal direction but no edge is detected in the vertical direction, that is, when the vertical correlation is strong. A third region RG3 is selected to employ the H filter 64 when an edge is detected in the vertical direction but no edge is detected in the horizontal direction, that is, when the horizontal correlation is strong. A fourth region RG4 is selected to employ the d filter 62 when edges are detected in both vertical and horizontal directions. Thus, the filter selector 70 of FIG. 3 selects any one of the first to fourth filter signals F1 to F4 output from the D filter 62, H filter 64, V filter 66 and H-V filter 68 by comparing the horizontal/vertical threshold values $T_H$ and $T_V$ with the vertical/horizontal difference detecting signals applied from the line and sample difference detectors 58 and 60.

Figure 8:
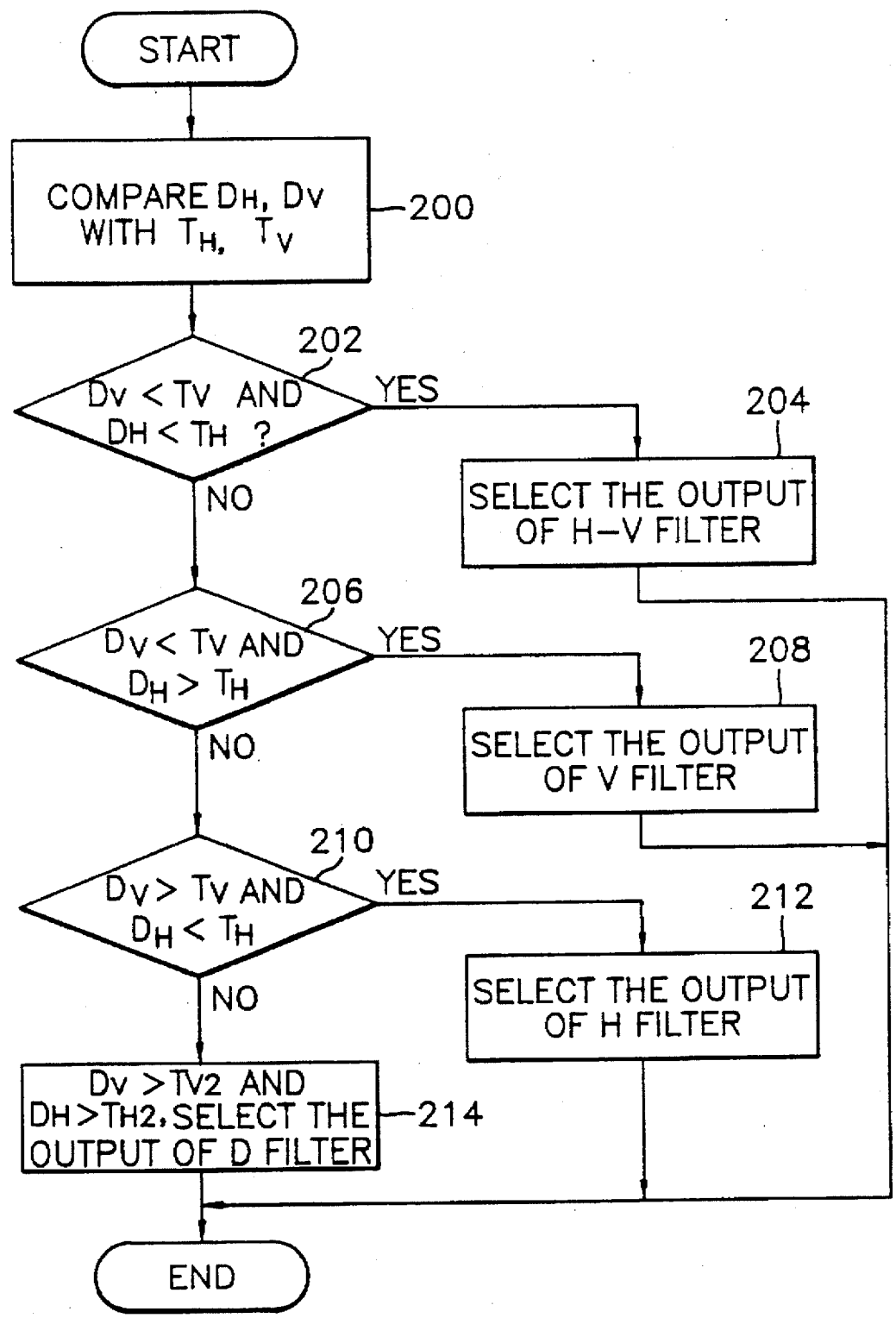
FIG. 8 is an exemplary flow chart showing the selecting operation of a filter selector which can be employed by the circuitry of FIG. 3.

The output signal Z of the filter selector 70 is selected as shown in the flow chart of FIG. 8 which shows the selecting operation of the filter selector 70 of FIG. 3. In step 200, the filter selector 70 compares the horizontal/vertical threshold values $T_H$ and $T_V$ with the vertical/horizontal difference detecting signals $D_V$ and $D_H$. In step 202, the filter selector 70 checks whether the vertical difference detecting signal $D_V$ is less than the vertical threshold value $T_V$, and whether the horizontal difference detecting signal $D_H$ is less than the horizontal difference detecting signal $T_H$. If $D_V < T_V$ and $D_H < T_H$, the filter selector 70 selects the output of the H-V filter 68, i.e., the fourth filter signal F4 in step 204. If not, the filter selector 70 proceeds to the step 206 and checks $D_V < T_V$ and $D_H > T_H$. If $D_V < T_V$ and $D_H > T_H$ the filter selector 70 proceeds to the step 208 and selects the output of the V filter 66, i.e., the third filter signal F3. If not, the filter selector 70 proceeds to the step 210 and checks $D_V > T_V$ and $D_H < T_H$. If $D_V > T_V$ and $D_H < T_H$, the filter selector 70 proceeds to the step 212 and selects the output of the H filter 64, i.e., the second filter signal F2. If $D_V > T_V$ and $D_H > T_H$, the filter selector 70 proceeds to the step 214 and selects the output of the D filter 62, i.e., the first filter signal F1.

Through the filter selecting operation as shown in FIG. 8, the filter selector 70 selects the filter signal corresponding to the sample signal having the strongest correlation, thereby securing a high resolution. The output signal Z of the filter selector 70 is band-pass filtered through the band pass filter 71. The signal output from the band-pass filter 71 is a color signal C. The adder 72 adds the negative color signal C to the sample signal P to thereby output the luminance signal Y.

High resolution of the picture can be secured through the Y/C signal separating/filtering circuit using the above process. The Y/C signal separating circuit according to the present invention separates and filters the Y/C signals adaptive to the conditions when an edge is detected in the horizontal or vertical direction, or edges are detected in various directions, as well as when no edge is detected, so that it is possible to perform an effective operation with high resolution.

As described above, the Y/C signal separating circuit according to the present invention considers the vertical/horizontal correlation of the sample signals in a neighborhood, as well as the direction in which the edge is detected, and then filters the composite video signal in the direction of the signal having the strongest correlation, to effectively separate the luminance and color signals from the composite video signal. Hence, the Y/C signal separating circuit according to the present invention can secure a very high resolution.

Although one particular embodiment of the present invention has been described, it will be obvious to those skilled in the art that changes and modifications may be added without departing from the spirit and scope of the present invention.

What is claimed is:

1. A method for separating luminance and color signals from a composite video signal sampled at multiple times the color subcarrier frequency in an NTSC type picture processing system, said method comprising the steps of:

(a) delaying said composite video signal through a plurality of line and sample delay elements, thereby generating a plurality of delayed sample signals;

(b) detecting respective correlations between a predetermined reference sample signal and predetermined ones of said delayed sample signals which are in-phase with said reference sample signal and which are displaced in respective upper/lower/left/right directions from said reference sample signal and then determining a direction in which said luminance and color signals are to be separated and filtered based on the detected correlations;

(c) separating and filtering said luminance and color signals from said composite video signal in selected ones of the determined direction and a plurality of predetermined directions; and (d) detecting vertical and horizontal correlations of said delayed sample signals which are out-of-phase with said reference sample signal and which are separated from said reference sample signal in the upper/lower/left/right directions, and then selecting said luminance and color signals separated and filtered in said step (c) on the basis of the detected said vertical and said horizontal correlations.

2. The method according to claim 1, wherein said step (b) further comprises detecting that one of said delayed sample signals having the strongest correlation with respect to said reference sample signal and determining the respective direction in which said luminance and color signals are to be filtered in response to a respective detection result.

3. The method according to claim 2, wherein said step (d) comprises detecting said vertical and said horizontal correlations of said delayed sample signals using respective absolute values of associated differences between said reference sample signal and neighboring ones of said delayed sample signals.

4. The method according to claim 1, wherein said step (c) comprises the step of selectively performing:

diagonal filtering thereby separating and filtering said luminance and color signals in the direction which is inclined with respect to of either the horizontal or the vertical direction;

horizontal filtering thereby separating and filtering said luminance and color signals in the horizontal direction;

vertical filtering thereby separating and filtering said luminance and color signals in the vertical direction; and and non-edge filtering thereby separating and filtering said luminance and color signals when no edge is detected.

5. The method according to claim 4, wherein said diagonal filtering sub-step comprises:

up filtering for separating and filtering said luminance and color signals in the upper direction from said reference sample signal;

down filtering for separating and filtering said luminance and color signals in the lower direction from said reference sample signal;

left filtering for separating and filtering said luminance and color signals in the left direction from said reference sample signal; and right filtering for separating and filtering said luminance and color signals in the right direction from said reference sample signal, thereby selectively performing any one of said up filtering, down filtering, left filtering and right filtering.

6. A method for separating luminance and color signals from a composite video signal sampled at multiple times the color subcarrier frequency in an NTSC type picture processing system, said method comprising the steps of:

detecting respective correlations between a reference sample signal and respective sample signals which are respectively separated from said reference sample signal in upper/lower/left/right directions and then determining a respective direction from among upper, lower, left and right directions of the one of said sample signals having the strongest correlation with said reference sample signal based on the detected correlations, wherein the correlations indicate the existence of an edge in the video signal oriented in one of upper, lower, left and right directions with respect to said reference sample signal; and separating and filtering said luminance and color signals in said determined direction on the basis of said reference sample signal.

7. A circuit for separating luminance and color signals from a composite video signal in an NTSC type picture processing system, said circuit comparing:

sample signal generating means for delaying said composite video signal through a plurality of line and sample delay elements, thereby generating a reference sample signal and a plurality of respective delayed sample signals;

first filtering means for detecting respective correlations between said reference sample signal and the respective delayed sample signals, said delayed sample signals being respectively separated from said reference sample signal in upper/lower/left/right directions and being in-phase with respect to said reference sample signal, and for separating and filtering said luminance and color signals from said composite video signal in a respective direction of that one of said delayed sample signals having a maximum correlation with respect to said reference sample signal;

second filtering means for separating and filtering said luminance and color signals from said plurality of delayed sample signals, generated from said sample signal generating means, in a plurality of predetermined directions;

correlation detecting means for detecting horizontal and vertical correlations between said reference sample signal and respective ones of said delayed sample signals which are separated from said reference sample signal in the upper/lower/left/right directions and which are out of phase with said reference sample signal; and filter selecting means for selecting one of respective outputs from said first filtering means and said second filtering means responsive to said horizontal and said vertical correlations and predetermined filter selecting threshold values.

8. The circuit according to claim 7, wherein said first filtering means comprises:

direction determining means for comparing respective absolute values of associated differences between said reference sample signal and a corresponding neighboring one of said delayed sample signals and for determining the direction of that one of said delayed sample signals having said maximum correlation with said reference sample signal, so as to output said direction control signal; and filtering means for separating and filtering said luminance and color signals from said delayed sample signals in said direction determined by said direction determining means in response to said direction control signal.

9. The circuit according to claim 8, wherein said filtering means comprises:

a direction filtering unit for separating and filtering said luminance and color signals from said delayed sample signals generated by said sample signal generating means in the upper/lower/left/right directions on the basis of said reference sample signal, while every time delaying said composite video signal; and a selecting unit for selecting that one of said delayed sample signals which have been separated and filtered by said direction filtering unit in response to said direction control signal.

10. The circuit according to claim 8, wherein said filtering means comprises:

a selecting unit for selecting one of said delayed sample signals in response to said direction control signal output from said direction determining means; and a direction filtering unit for separating and filtering said luminance and color signals from said delayed sample signals generated by said sample signal generating means in the direction of said delayed sample signal selected by said selecting unit on the basis of said reference sample signal, while every time delaying said composite video signal.

11. A circuit for separating luminance and color signals from a composite video signal in an NTSC type picture processing system, said circuit comprising:

sample signal generating means for delaying said composite video signal through a plurality of line and sample delay elements and then generating a plurality of respective sample signals;

direction determining means for determining the direction from among upper, lower, left and right directions of the one of the respective sample signals having a maximum correlation with respect to a reference sample signal to thereby output a respective direction control signal, wherein the correlation indicates the existence of an edge in the video signal oriented in one of upper, lower, left and right directions with respect to said reference sample signal; and filtering means for separating and for filtering said luminance and color signals from said composite video signal in a direction corresponding to said direction control signal.

12. The method according to claim 6, wherein said sample signals are in-phase with said reference sample signal.

13. The circuit according to claim 11, wherein said sample signals are in-phase with said reference sample signal.

* * * * *